July 5, 1955   H. D. MARTIN   2,712,481
SEPARATOR FOR ANTIFRICTION BEARINGS
Filed Feb. 24, 1953

INVENTOR;
HARRY D. MARTIN.
By Edward H. Goodrich.
HIS ATTORNEY.

United States Patent Office 2,712,481
Patented July 5, 1955

2,712,481

SEPARATOR FOR ANTIFRICTION BEARINGS

Harry D. Martin, Bristol, Conn., assignor to General Motors Corporation, Detroit, Mich., a corporation of Delaware Application February 24, 1953, Serial No. 338,355

8 Claims. (Cl. 308—201)

This invention relates to separators or retainers for guiding the rolling elements in antifriction bearings and comprises all of the features of novelty herein disclosed.

Heretofore, it has been usual in antifriction bearing constructions to provide annular metal separators with peripherally spaced pockets each of which loosely receives a rolling element. During the operation of these antifriction bearings, the rolling elements peripherally rub against the pocket walls producing detrimental friction and wear even in the presence of bearing lubricant. In a radially loaded antifriction bearing, the rolling elements usually change their rates of movement when entering and leaving the loaded zone thus causing the rolling elements to strike against the pocket walls which results in further wear as well as objectionable noise. When such a bearing is subjected to high speed operation, this frictional wear is greatly increased and frequently results in detrimental heating of the bearing which causes oxidation and hardening of the lubricant with a consequent shortened bearing life.

It is therefore an object of this invention to provide for an antifriction bearing an improved separator which receives and guides rolling elements under a very low coefficient of friction.

Another object is to provide an improved separator which will cushion the movements of rolling elements in an antifriction bearing.

A further object is to provide in an antifriction bearing an improved separator easily formed from sheet materials and which antifrictionally and yieldably engages rolling elements and resiliently absorbs non-uniform movements of these rolling elements during operation of the bearing.

To these ends and also to improve generally upon devices of this character, this invention consists in the various matters hereinafter described and claimed. In its broader aspects, the invention is not necessarily limited to the specific structure selected for illustrative purposes in the accompanying drawings wherein Figure 1 is a sectional view through an antifriction bearing and showing my separator in full elevation;

Figures 1, 2:
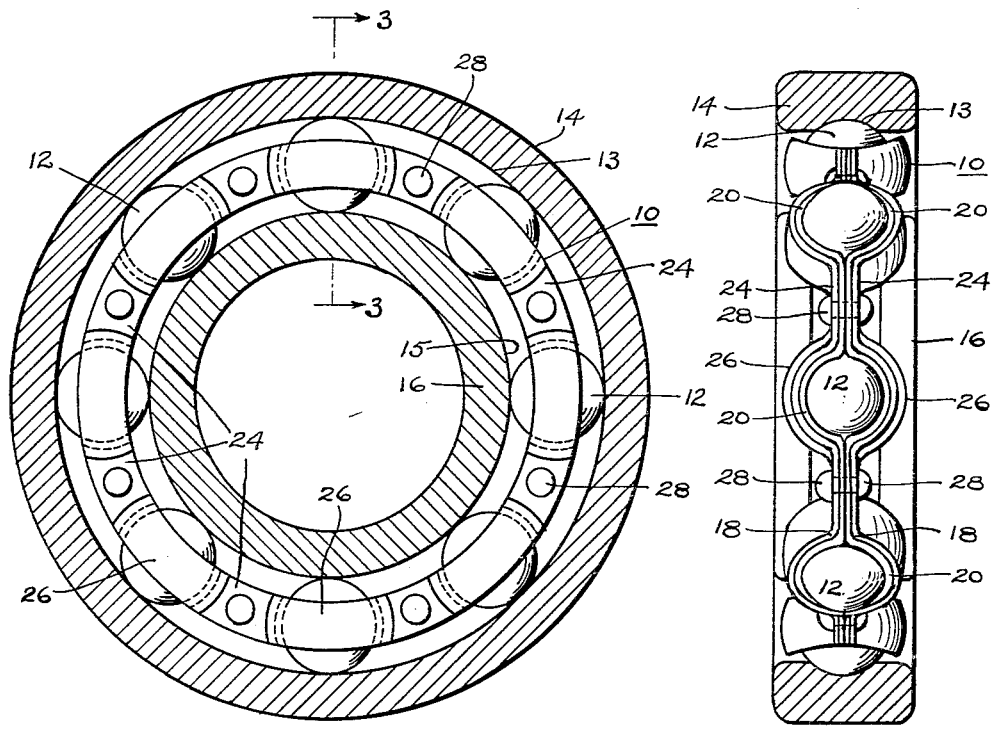
Figure 2 is a diametrical section through the bearing of Figure 1 and showing the separator in full elevation.
Figures 3, 4:
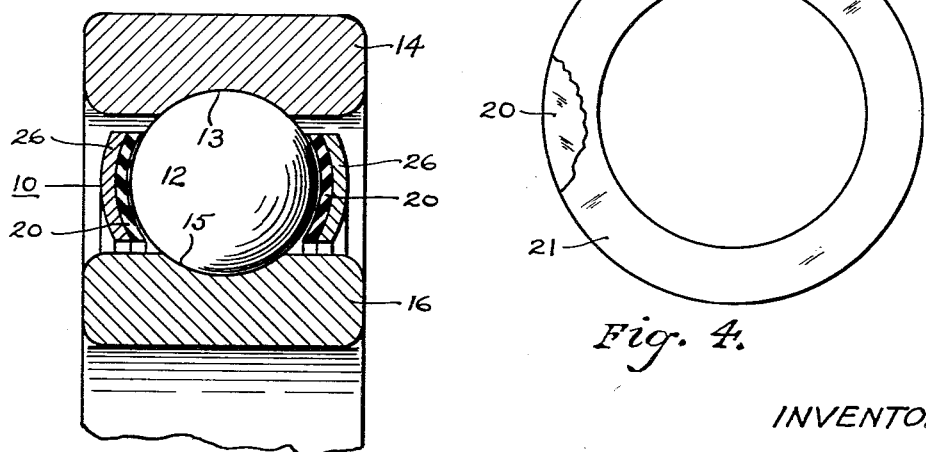
Figure 3 is an enlarged fragmentary cross section through the bearing and taken along the line 3—3 of Figure 1.
Figure 4 is a side elevation of a laminated ring from which the separator halves are formed.

The separator 10 is shown applied to rolling elements, as balls 12, in rolling engagement with a raceway 13 in an outer race ring 14 and with a raceway 15 in an inner race ring 16. The separator has two corresponding rings 18 each of which may be bent to form from a laminated flat annulus 19 stamped out from sheet materials and preferably comprising a layer of inherently resilient material 20 permanently bonded to a sheet metal annulus 21. When bent to corresponding shape by suitable dies, the rings 18 have uniformly spaced flats or lands 24 alternating with arcuate portions 26 which cooperatively provide ball pockets that respectively receive the balls 12 for free rotation therein. In the illustrated separator, the ball pockets are both peripherally and radially curved to provide pocket walls that are substantially parti-spherical and which retain the balls in unit-handling relation with the separator that is held together by rivets 28 passing through corresponding lands 24 in each ring 18. With this construction, the separator is supported by the balls and located out of engagement with both race rings 14 and 16. However, it should be understood that my invention also applies to separator constructions wherein the separator may be supported for rotation on the cylindrical lands at each side of one of the raceways.

The layer of inherently resilient material is bonded to the inner faces of the rings 18 and provides the inner pocket walls with a yieldable lining having a very low coefficient of friction in engagement with the balls and also serves to resiliently cushion the individual ball movements particularly during any non-uniform rolling of the balls between the race rings when the balls enter and leave the loaded zone of the bearing. This yieldable lining 20 eliminates the objectionable frictional drag with consequent wear and noise present in previous antifriction bearings due to the striking and rolling of the metal rolling elements against the metal walls of the separator pockets. The cushioning layer 20 which is deformably resilient in all directions may comprise various oil resistant yieldable rubber like materials that will not deteriorate in the presence of bearing lubricants and which will have a very low coefficient of friction in engagement with the rolling elements in a bearing. Silicone rubber is a satisfactory oil resistant material suitable for the cushioning linings of my separator pockets. Also, polymers of chloroprene as well as co-polymers of ethylene dichloride and sodium polysulphide known as "Thiokol," and polymerization products of butadiene and acrylic nitrile are further examples of resilient coatings for my rings 18.

I preferably bond the layer of resilient material 20 to the metal sheet 21 as by a cement or by vulcanizing before the rings 19 are stamped out and bent to form the separator halves 18. Due to its inherent resiliency, the cushioning sheet 20 will not interfere with bending the separator halves to required shape and the sheet 20 will remain securely bonded to and in conforming relation with the inner separator wall. If desired, the sheet metal rings 21 may be first bent to form the rolling element receiving pockets after which these pockets may be coated with the cushioning lining that may be bonded in position as by vulcanizing. This coating of the preformed separator halves may be applied by dipping the preformed metal rings in the synthetic rubber solution or by spraying the rubber solution into the pocket followed by evaporation of the solvent and vulcanization.

I claim:

1. In a separator for spacing rolling elements between a pair of race rings, an annular member provided with a plurality of peripherally spaced pockets, a rolling element in each pocket and engaging both race rings, a lining of resiliently deformable cushioning material in each pocket and bonded to the annular member, and said lining surrounding the rolling element in a pocket and yieldably cushioning its movement in the separator.

2. In a separator for spacing rolling elements between a pair of race rings, an annular member provided with a plurality of peripherally spaced pockets, a rolling element in each pocket and engaging both race rings, a sheet of inherently resilient rubber-like material lining each pocket and bonded to the annular member, and said pocket lining having a low coefficient of friction in engagement with a rolling element and yieldably cushioning the rolling element movement in the annular member.

3. In a separator for spacing rolling elements between a pair of relatively rotatable race rings, a pair of cooperating annular members bent to shape and cooperatively providing peripherally spaced pockets radially opening onto the race rings, a sheet of inherently resilient material bonded to the inner faces of the annular members and lining the walls of said pockets, a rolling element in each pocket and engaging the race rings, and said inherently resilient material yieldably engaging the rolling elements with a low coefficient of friction and holding the rolling elements out of engagement with said annular members.

4. In a separator for spacing rolling elements between a pair of relatively rotatable race rings, a pair of cooperating laminated rings each having a sheet of oil resistant inherently resilient material bonded to a metal sheet, the laminated rings being bent to form a pair of interengaging annular members having spaced flat portions alternating with opposed arcuate portions which cooperatively provide pockets opening radially towards the race rings, the sheets of resilient material conforming with said annular members and lining the pockets, and a rolling element loosely received in each pocket and yieldably engaged by the pocket lining which has a low coefficient of friction in engagement therewith.

5. In a separator for spacing rolling elements between a pair of relatively rotatable race rings, a pair of cooperating sheet metal annular members, each member having a series of peripherally spaced flat portions alternating with arcuate portions, means securing corresponding flat portions of the annular members together, the corresponding arcuate portions forming pockets opening onto the race rings, a ball loosely received in each pocket for rotation on both race rings, and a sheet of inherently resilient material bonded to the walls of the pockets and having a low coefficient of friction in engagement with the adjacent ball and cushioning the movement of the ball in a pocket.

6. In a separator for spacing rolling elements between a pair of relatively rotatable race rings, a pair of cooperating sheet metal annular members bent to shape from flat stock, each annular member having a series of peripherally spaced flat portions alternating with a series of peripherally spaced arcuate portions that are curved both radially and peripherally thereof, means fastening corresponding opposed flat portions of both sheet metal members together, the corresponding opposed arcuate portions forming parti-spherical pockets opening onto the race rings, a ball in each pocket and engaging the race rings, the arcuate portions holding the balls in unit handling relation with the annular members, and a coating of inherently resilient rubber-like material lining the walls of each pocket and bonded to the annular members, said rubber-like material having a low coefficient of friction in engagement with a ball and cushioning said ball movement in a pocket.

7. In a separator for spacing rolling elements between a pair of race rings, a pair of annular members cooperatively providing peripherally spaced pockets radially opening onto the race rings, rolling elements respectively received in the pockets and engaging the race rings, and each annular member having a coating of inherently resilient rubber-like material which has a low coefficient of friction in engagement with the rolling elements.

8. In a separator for spacing rolling elements between a pair of race rings, a pair of annular members having peripherally spaced flat portions alternating with arcuate portions, each annular member being coated on one side with a layer of oil-resistant rubber like material permanently bonded thereto, means securing the corresponding flat portions together, said arcuate portions cooperatively providing pockets opening onto the race rings, and a ball loosely received in each pocket and engaging both race rings, the movements of the balls with the pockets being cushioned by said layer of rubber-like material.

References Cited in the file of this patent

UNITED STATES PATENTS

| | | |
|---|---|---|
| 1,353,044 | Keiper | Sept. 14, 1920 |
| 1,928,352 | Goodell | Sept. 26, 1933 |
| 2,038,095 | Bott | Apr. 21, 1936 |
| 2,550,911 | Cobb | May 1, 1951 |

FOREIGN PATENTS

| | | |
|---|---|---|
| 615,107 | Great Britain | Jan. 3, 1949 |